UNITED STATES PATENT OFFICE.

W. R. THOMAS AND M. EMANUEL, JR., OF CATASAUQUA, PENNSYLVANIA.

IMPROVED COMPOSITION FOR BLASTING-POWDER.

Specification forming part of Letters Patent No. 37,117, dated December 9, 1862.

*To all whom it may concern:*

Be it known that we, W. R. THOMAS and MORGAN EMANUEL, Jr., both of Catasauqua, in the county of Lehigh and State of Pennsylvania, have invented a new and useful Improvement in Blasting Compounds; and we do hereby declare that the following is a full, clear, and exact description of the same.

This invention relates to the blasting compound for which we obtained Letters Patent No. 34,654, dated March 11, 1862.

The principal object of this improvement is to prevent the separation of the sulphur from the bark or any other woody or carbonaceous matter that we may use as a substitute therefor; and to this end it consists in the addition to the compound of bark or other woody or carbonaceous matter, nitrate of soda, sulphur, and chlorate of potash of a suitable quantity of starch to prevent such separation.

The proportions of the several ingredients which we commonly employ in the manufacture of the improved compound and the mode of manufacture are as follows: Take of nitrate of soda, seven and a half (7½) pounds; flowers of sulphur, two (2) pounds; chlorate of potash, two (2) pounds; ground bark, nine (9) pounds; starch, two (2) pounds; water, six (6) quarts.

Dissolve the starch in a small quantity of the water in a cold state. Heat the remainder of the water to the boiling-point, and after having dissolved therein the nitrate of soda and the chlorate of potash add and mix in the starch, and then put the bark into the solution, which should be again brought to the boiling-point and kept boiling until the bark is perfectly saturated. Next pour the whole into a box or trough and add the sulphur, and stir till the sulphur is well mixed, and when this has been effected the compound only requires to be dried to make it ready for use.

We will state that the proportions of the several ingredients of the compound may be varied to some extent without materially changing the character or efficiency of the compound; but the proportions we have mentioned are those which we find to be best. We will also state that instead of ground bark, sawdust or any other carbonaceous material may be used, in about the same proportions.

What we claim as our invention, and desire to secure by Letters Patent, is—

The blasting compound made of nitrate of soda, sulphur, chlorate of potash, starch, and ground bark or other absorbent carbonaceous material, substantially in the manner and in about the proportions herein specified.

W. R. THOMAS.
MORGAN EMANUEL, JR.

Witnesses:
PRESTON H. MARTIN,
DAVID G. MORRIS.